Patented Sept. 2, 1952

2,609,363

UNITED STATES PATENT OFFICE 2,609,363

COPOLYMERIZATION OF DIVINYL BENZENE AND ISOBUTYLENE

Lester Marshall Welch, Madison, N. J., assignor to Standard Oil Development Company, a corporation of Delaware No Drawing. Application October 29, 1948, Serial No. 57,407

8 Claims. (Cl. 260—88.1)

This invention relates to copolymers of isobutylene and particularly to copolymers of isobutylene and multiolefins of the type of divinylbenzene such as divinyl-benzene itself and its analogs, whereby the character of the obtainable polymer is sharply modified to produce either a superior curable polymer or a type of polymer particularly adapted to use as a pressure sensitive adhesive or for electrical insulation in which the property of cold flow is markedly reduced.

In the prior art, it has been found possible to prepare a considerable number of extremely valuable copolymers of isobutylene with various of the diolefins and multiolefins such as butadiene, isoprene, dimethyl butadiene, mercene and the like, copolymers being produced to contain multiolefins having from 4 to about 14 carbon atoms per molecule. It has also been found possible to modify the properties of such copolymers by the addition of traces of divinylbenzene in amounts of from one-tenth to five parts per hundred parts of isobutylene, with from two to thirty or forty parts of the multiolefins being used. All of these polymers are, however, more or less deficient in that they show undesirably high properties of cold flow before curing, and all are somewhat low in curing speed.

According to the present invention, it is found that a highly valuable copolymer can be produced from isobutylene and divinylbenzene or substituted divinylbenzenes. By this procedure there is obtained a copolymer in which the amount of cold flow is markedly less, when the material is used for the making of such materials as inner tubes or other rubber-like goods in which the material is required to have a fair amount of stiffness or mechanical strength before curing. It is also found that a polymer of this type containing substantial or significant amounts from about one-half part of divinylbenzene per hundred of isobutylene up to five parts to ten parts or even occasionally as high as fifteen or twenty parts per hundred of isobutylene is particularly valuable for uses in which it is not cured such as in pressure sensitive coatings ("Scotch tape" type of structures) because of the greatly reduced tendency toward cold flow, and the maintenance of a very high adhesiveness.

Thus the present invention consists in the production of a simple copolymer of isobutylene and a divinyl type substance. The first embodiment of the invention utilizes isobutylene of good purity, preferably at least 95% purity and better, from 98% to 99% purity. With this there is then mixed a suitable amount of divinylbenzene, preferably from one-tenth part to a maximum of twenty parts per hundred of isobutylene.

Instead of divinyl benzene any of the divinyl aromatic substances may be used, including such substances as divinyltoluene, or divinyl xylene or divinylnaphthalene, or the like. According to the present invention any compound containing one or more aromatic nuclei substituted by at least two vinyl radicals may be used, provided only that any other substituents present are not such as to interfere with the polymerization, or that sufficient steric hindrance is present to prevent interference. That is, halo substituted divinyl aromatics are as satisfactorily usable as are the simple divinyl benzenes.

Similarly, the number of carbon atoms in auxiliary saturated substituents is without significance. Thus, a divinyl benzene containing one methyl substituent to produce a divinyl toluene is satisfactorily usable, and one or more larger aliphatic radicals may be present without injury to the reactivity of the compound. These include such compounds as divinyl ethyl benzene or divinyl propylbenzene or divinylbutylbenzene and the like, up at least to divinyl dodecylbenzene which likewise is usable, and it does not appear that there is any significant difference in reactivity among the various isomeric forms. It does not even appear that it is necessary that the substituent be fully saturated, since the substituent may also contain one or more carbon to carbon double linkages.

These compounds are all to be regarded as analogs of divinyl benzene and are representative only since there are many more analogous compounds which are equally usable.

The resulting mixture is then cooled to a temperature within the range between about —10° C., and about —100° C., as obtainable by the use of various refrigerants, and by reduced pressures on a refrigerating jacket containing liquid ethylene, or even lower, to temperatures obtainable by mixtures of liquid hydrocarbon refrigerants with liquid methane, even down to —164° C., at the boiling point of liquid methane, although these latter temperatures, being expensive to obtain, are commercially undesirable. When the desired low temperature has been obtained, the material is stirred vigorously by an appropriate stirrer and then a catalyst in the form of a solution of a Friedel-Crafts type catalyst in solution in a low freezing non-complex forming solvent or in liquid condition is then added to the cold unsaturate mixture.

For this purpose aluminum chloride in solution in methyl chloride is the preferred catalyst but for many uses boron tri-fluoride either in gaseous form or in solution in such solvents as liquid propane, liquid ethane, liquid ethylene or even higher boiling solvents is entirely usable. Similarly, aluminum bromide, especially in solution in a hydrocarbon, is usable as is also titanium tetrachloride and the other similar Friedel-Crafts catalysts.

Thus, for the Friedel-Crafts active methyl halide catalyst substance any of the Friedel-Crafts metals disclosed by N. O. Calloway in his article on "The Friedel-Crafts Synthesis" printed in the issue of "Chemicals Reviews," published for the American Chemical Society at Baltimore in 1935 in volume XVII, No. 3, the article beginning on page 327, the list being particularly well shown in page 375 may be used.

Such catalysts as boron trifluoride and titanium tetrachloride are normally fluid at room temperature and usually sufficiently fluid at reduced temperatures to be usable as catalysts substances directly. The other substances must be dissolved in appropriate solvents. For this solvent, it is required only that it be low freezing, thereby having a freezing point below the freezing point of water, and that it shall be non-complex forming; this requirement being that there shall not separate out from solution on evaporation of the solvent a compound between the solvent and the Friedel-Crafts catalysts; or that the boiling point of the solvent shall be lowered by only a small amount from its normal boiling point by the presence of the solvent; or as pointed out by Findley in "The Phase Rule and Its Application," 6th edition, Longmans, Green and Company, New York, the solvent to be non-complex forming must permit of the addition of the solvent in the form of a vapor to the catalyst at constant temperature and when so added lead to a substantially continuous change in the composition of the catalyst phase and to a continuous increase in the partial pressure of the solvent. In general the catalyst can be recovered unchanged by removal of the solvent.

There may also be present in the polymerization reaction a suitable diluent which may take the form of any of the normal halo substituted aliphatic compounds such as ethyl or methyl chloride, ethyl or methyl dichloride, chloroform, ethylene tetrachloride or the like. For this purpose any of the halo substituted alkyl compounds which are liquid at the polymerization temperature are more or less satisfactory. Alternately also, such substances as carbon disulfide or the petroleum hydrocarbons may be used as diluents. It is found that the presence of the diluents is markedly helpful in that it reduces and minimizes the amount of cross linkage formed and reduces the amount of hydrocarbon insoluble polymer produced.

It may be noted that the amount of divinyl compound copolymerized from any given mixture is a function of the relative copolymerizability of the isobutylene and the divinyl compound present. These compounds are less troublesome than such diolefins as butadiene, in that they tend to copolymerize more nearly in the proportion in which they are present in the mixture. However, some show a markedly higher copolymerizability rate and some show a distinctly lower copolymerizability rate, and accordingly, there is no necessary connection between the proportion of divinyl compound in the polymer and the amount in the polymerizate feed.

It is found, however, that the presence of divinyl benzene tends rather strongly to the production of insoluble gel material which interferes with subsequent processing. This material can be removed by dissolving the polymer in hydrocarbon solvent and filtering the solution, preferably in the presence of an appropriate filter aid, such as an infusorial earth, or the like, but in any event, it is found that the proportion of divinyl benzene in the finished polymer should be kept below about 2% to 3% or about 20% in the feed since higher values strongly tend to the production of gel, both in the polymerizer, and during subsequent processing.

Low values of insoluble gel polymer can also be obtained by including small amounts of the normal butenes in the polymerizate mixture. It does not appear that the normal butenes interpolymerize, but they do exert a profound effect on the polymerization, reducing both the amount of gel polymer and the obtainable molecular weight.

The resulting polymer usually is a white plastic solid, depending to some extent upon the presence of impurities, to some extent upon the temperature of polymerization, and to some extent upon the temperature of polymerization as well as upon the particular catalyst used. The polymer obtained may show an iodine number ranging from about 0.4 up to amounts as high as about 50. Polymer having the molecular weight of above about 20,000 is still somewhat plastic but with only small amounts of cold flow. Thus if the molecular weight is above about 20,000, and the iodine number above from 0.4 to 1, the polymer shows the valuable property of a curing reaction with such substances as sulfur or with paraquinone dioxeme and its homologs or with the various dinitroso compounds to yield a cured polymer substance having a definite tensile strength and a definite elongation at break, which is an excellent substitute for or replacement for caoutchouc. When so cured, tensile strengths ranging from 500 lbs. per square inch up to 3500 or even 400 lbs. per square inch are obtainable, with elongations at break ranging from 250% up to 1200%, depending upon the degree of cure and the type and amount of fillers and other additives present. This polymer, capable of curing, shows the very valuable property of almost complete absence of cold flow before curing thereby greatly simplifying the preparation of inner tubes wire insulation and other rubber-substitute structures.

Alternatively, and within the scope of the invention, by the use of temperatures within the range between about —10° C. and about —40° C., with the less potent catalyst and less pure reactants, copolymers ranging from molecular weights in the order of 1000 to 20,000 are obtainable. Copolymers within this molecular weight range do not cure to a solid, substance having a definite tensile strength and definite elongation at break. They are, however, extremely valuable for many purposes such as for the production of cements. Copolymers with a molecular weight ranging from 5000 to about 15,000, either as such, or in combination with a wide range of other substances, such as rubber, thermoplastic resins and plasticizers, may be used for highly valuable pressure sensitive materials which show a minimum of cold flow and a maximum tackiness and a maximum firmness of holding of the pressure sensitive coated sheet to the desired object. The above indicated top of 15,000 molecular weight is not, however, a limiting value, since it is found that polymers having molecular weights as high as 35,000 or even 40,000 are desirable for some forms of adhesives, especially when they are modified by small amounts of softeners such as the fluid hydrocarbons or by simple polybutenes, or by broken-down rubber, or the like.

Thus it will be observed that the copolymer of the present invention has various widely different items of utility, depending in part on the molecular weight, in part on the presence of associated compounds and in part on the particular use desired.

EXAMPLE I

Two mixtures of isobutylene with divinylbenzene were prepared as shown in the subjoined Table 1 together with appropriate amounts of diluent. The first of these mixtures contained 350 parts of isobutylene, 10 parts of divinylbenzene, and 1050 parts of methyl chloride whereas the second mixture was the same except for the use of 20 parts of divinylbenzene. These mixtures were cooled to a temperature of approximately —98° C., by the use of a jacket of liquid ethylene on the reactor, and were then polymerized by the addition of an appropriate catalyst consisting of a solution of approximately 26 parts of aluminum chloride per 100 cc., of methyl chloride. The unsaturate mixture was vigorously stirred and the catalyst solution added in a small high pressure jet into the body of the strongly stirred mixture of unsaturate and diluent. The polymerization reaction proceeded rapidly and it was found that each gram of aluminum chloride in the catalyst would produce approximately 220 grams of solid polymer. As shown in the table, the respective polymers showed molecular weights of 34,200 and 42,200 and iodine numbers respectively of 2.0 and 3.5.

These polymers were removed from the polymerization mixture, brought up to room temperature, washed on the double roll mill with water to remove residual volatiles and catalysts, and then were compounded according to the following recipe and cured.

|  | Parts |
|---|---|
| Copolymer | 100 |
| Stearic acid | 5 |
| Zinc oxide | 5 |
| Carbon black | 10 |
| Sulfur | 3 |
| Tetra-methyl thiuram disulfide | 1 |

The resulting compounds were then cured for 8, 16 and 32 minutes in each instance and tensile strength, elongation and modulus determined the yield the values shown in the subjoined Table I.

| Run No. | Time of Cure, Min. | Tensile | Elongation | Modulus 300% | Modulus 400% |
|---|---|---|---|---|---|
| 1 | 8 | 370 | 740 | 50 | 120 |
|  | 16 | 490 | 720 | 40 | 130 |
|  | 32 | 730 | 610 | 210 | 400 |
| 2 | 8 | 300 | 800 | 100 | 150 |
|  | 16 | 500 | 700 | 160 | 260 |
|  | 32 | 790 | 680 | 310 | 470 |
| 3 | 8 | Poor Cure |  |  |  |
|  | 16 |  |  |  |  |
|  | 32 |  |  |  |  |

This table shows the production of an excellent copolymer suitable as a very valuable replacement for natural rubber which is particularly suitable for tires, tubes; for proofed goods, and for such goods as rubber gloves and other "dipped goods" and wire insulation.

EXAMPLE II

A series of polymerizations were made in which the divinylbenzene concentration in the feed ranged from 0.1 weight percent to 0.8 weight percent, based on isobutylene. A temperature of —100° C. was maintained in the reactor by using liquid ethylene as the internal refrigerant to the extent of 3 volumes of ethylene to one volume of isobutylene. To this mixture there was then added 10% of butene-1 based on the isobutylene present in the feed to modify the polymer by reducing molecular weight and increasing its solubility. The polymerization was carried out by adding a catalyst solution consisting of 0.38 gm. AlCl₃ per 100 cc. of methyl chloride. The following data were obtained:

| Percent DVB in Feed Based on C₄= | Percent Conv. of C₄= | Mooney @ 212° F. | Percent Gel in Polymer | Percent Flow @ 60° C. 1.8 Kg/sq. cm. for 4 weeks |
|---|---|---|---|---|
| 0.0 | 80 | 65 | 0.0 | 37 |
| 0.1 | 70 | 69 | 8.3 | <5 |
| 0.2 | 40 | 64 | 21.4 | 0 |
| 0.4 | 64 | 79 | 54.0 | 0 |
| 0.6 | 71 | 58 | 41.2 | 0 |
| 0.8 | 90 | 55 | 42.9 | <5 |

It is apparent from the above table that as little as 0.1% DVB in the feed greatly reduces the tendency of the polymer to flow.

This material thus is highly satisfactory for use as a pressure sensitive material in the making of "Scotch tape" type of material.

EXAMPLE III

In order to reduce gel content of the polymers and also to lower the Mooney viscosity or molecular weight of the polymers, the butene-1

*Table I*

[Divinylbenzene (D. V. B.) and isobutylene copolymerization.[1]]

| Run No. | Feed | | | Temperature of Polymerization °C. | Catalyst [2] | | Percent Conv.[3] | Staudinger Mol Weight | Iodine # |
|---|---|---|---|---|---|---|---|---|---|
|  | MeCl, cc. | Isobutylene, cc. | D.V.B., cc. |  | Conc. g./100 cc. | Eff. g.pol./g.cat. |  |  |  |
| 1 | 1,050 | 350 | 10 | —100 | 0.26 | 220 | 63 | 34,200 | 2.0 |
| 2 | 1,050 | 350 | 20 | —100 | 0.26 | 350 | 101 | 42,200 | 3.5 |
| 3 | 1,450 | 350 | 10 | —40 | 0.26 | 450 | 75 | 15,000 | 2.5 |

[1] Polymerizations were conducted in a 2.5 liter refrigerant jacketed batch reactor.
[2] Aluminum chloride dissolved in methyl chloride. [3] Based on isobutylene.

Tube Stock Cures at 320° C.

content of the feed was increased to 20 weight percent based on isobutylene and other conditions were maintained the same as given in Example II:

| Percent DVB in Feed Based on $C_4{=}$ | Percent Conv. of $C_4{=}$ | Mooney @ 212° F. | Percent Gel in Polymer | Percent Flow @ 60° C. 1.8 Kg/sq. cm. for 4 weeks |
|---|---|---|---|---|
| 0.2 | 33 | 49 | 1.1 | <5 |
| 0.4 | 98 | 45 | 6.7 | <5 |
| 0.6 | 59 | 46 | 11.2 | 0 |
| 0.8 | 90 | 56 | 42.1 | 0 |

The gel content of the above polymers was low when the DVB concentration in the feed was below 0.8%.

Thus the present invention produces a new copolymer consisting of a copolymer of isobutylene and a divinyl aromatic compound which within the respective molecular weight ranges is an excellent substitute for or replacement for natural rubber and an excellent substitute for previously used pressure sensitive coatings.

While there are above disclosed but a limited number of embodiments of the invention, it is possible to produce still other embodiments without departing from the inventive concept herein disclosed and it is therefore desired that only such limitations be imposed upon the appended claims as are stated therein or required by the prior art.

What is claimed is:

1. A copolymer of a major proportion of isobutylene with a minor proportion of a divinyl aromatic compound, there being no more than two carbon atoms present in each vinyl substituent on the aromatic nucleus and said copolymer having a molecular weight within the range between 1,000 and 100,000, the isobutylene being present in the reactant feed used for preparing the copolymer in the amount of at least 97%, and the divinyl aromatic compound being present in the reactant feed in an amount within the range between 0.1% and 0.8% and there being about 10 to 20% of 1-butene present in the reactant feed mixture, the copolymer having a minimum of cold flow and being characterized by the property of surface pressure sensitivity.

2. A copolymer such as that described in claim 1 in which the divinyl aromatic compound is divinyl benzene.

3. A copolymer such as that described in claim 1 in which the divinyl aromatic compound is divinyl toluene.

4. A copolymer such as that described in claim 1 in which the divinyl aromatic compound is divinyl naphthalene.

5. A polymerization process comprising the steps of mixing together a major portion of isobutylene, 0.1 to 0.8% of a divinyl aromatic compound having no more than two carbon atoms present in each vinyl substituent on the aromatic nucleus and from 10 to 20% of butene-1 based on the isobutylene, cooling the resulting mixture to a temperature within the range between −10° C. and −164° C. and polymerizing the mixture by the application thereto of a Friedel-Crafts active metal halide catalyst in solution in a low freezing, non-complex-forming solvent.

6. A copolymer such as that described in claim 5 in which the divinyl aromatic compound is divinyl benzene.

7. A copolymer such as that described in claim 5 in which the divinyl aromatic compound is divinyl toluene.

8. A copolymer such as that described in claim 5 in which the divinyl aromatic compound is divinyl naphthalene.

LESTER MARSHALL WELCH.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,274,749 | Smyers | Mar. 3, 1942 |
| 2,368,538 | Gleason et al. | Jan. 30, 1945 |